(12) United States Patent
Liu

(10) Patent No.: US 11,451,629 B2
(45) Date of Patent: Sep. 20, 2022

(54) DISTRIBUTED METADATA MANAGEMENT METHOD FOR DISTRIBUTED FILE SYSTEM

(71) Applicant: Hangzhou Juicedata Technology Limited, Zhejiang (CN)

(72) Inventor: Hongqing Liu, Zhejiang (CN)

(73) Assignee: Hangzhou Juicedata Technology Limited, Hangzhou (CN)

( * ) Notice: Subject to any disclaimer, the term of this patent is extended or adjusted under 35 U.S.C. 154(b) by 0 days.

(21) Appl. No.: 17/320,149

(22) Filed: May 13, 2021

(65) Prior Publication Data
US 2021/0360065 A1 Nov. 18, 2021

(30) Foreign Application Priority Data

May 14, 2020 (CN) .......................... 202010408285.8

(51) Int. Cl.
*H04L 67/1097* (2022.01)
*H04L 67/06* (2022.01)
*H04L 67/306* (2022.01)
*H04L 67/561* (2022.01)
*H04L 67/568* (2022.01)

(52) U.S. Cl.
CPC .......... *H04L 67/1097* (2013.01); *H04L 67/06* (2013.01); *H04L 67/306* (2013.01); *H04L 67/561* (2022.05); *H04L 67/568* (2022.05)

(58) Field of Classification Search
CPC . H04L 67/1097; H04L 67/06; H04L 67/2804; H04L 67/2842; H04L 67/306
See application file for complete search history.

(56) References Cited

FOREIGN PATENT DOCUMENTS

| CN | 101354726 | A | * | 1/2009 |
|----|-----------|---|---|--------|
| CN | 101697168 | A | * | 4/2010 |
| CN | 103218404 | A | * | 7/2013 |
| CN | 105550371 | A | * | 5/2016 |

OTHER PUBLICATIONS

Andrew W. Leung, et al., "Spyglass: Fast, Scalable Metadata Search for Large-Scale Storage Systems", 2009, 7th USENIX Conference on File and Storage Technologies, pp. 153-165 (Year: 2009).*
Mrudula Varade, et al., "Distributed Metadata Management Scheme in HDFS", May 2013, International Journal of Scientific and Research Publications, vol. 3, Issue 5, pp. 1-5 (Year: 2013).*

* cited by examiner

*Primary Examiner* — Jonathan A Bui
(74) *Attorney, Agent, or Firm* — Dragon Sun Law Firm, PC; Jinggao Li; Nathaniel Perkins

(57) ABSTRACT

The embodiments of the present disclosure discloses a distributed metadata management method for a distributed file system. A specific mode of carrying out the method includes: receiving a request to access a target metadata, wherein the request is sent by a first client, the request carries an ID of the target metadata, the ID consists of an area ID of the target metadata and an index ID of the target metadata; receiving the area ID returned by the first client; parsing the area ID and routing to a first target partition; finding the target metadata in the first target partition based on the index ID; and returning the target metadata to the first client. This method stores metadata in each partition of the server cluster.

8 Claims, 5 Drawing Sheets

DISTRIBUTED METADATA MANAGEMENT METHOD FOR DISTRIBUTED FILE SYSTEM

CROSS-REFERENCE TO RELATED APPLICATION

The present application is filed based on and claims priority to Chinese patent application No. CN 202010408285.8 filed on May 14, 2020, which is incorporated herein by reference in its entirety.

TECHNICAL FIELD

The embodiments of the present disclosure relate to the technical field of data storage, and in particular to a metadata management method for a distributed file system.

BACKGROUND ART

The distributed file system refers to a storage system that stores file data dispersedly on multiple independent devices. A distributed file storage system includes various storage devices and control units for storing programs, files and data, as well as devices and algorithms for information scheduling. The two most important constituent parts in a distributed file system are data service and metadata service, wherein the data service manages the data in the distributed file system, the data refers to the actual content of the file. The metadata service manages the source data in the distributed file system, the metadata refers to the data for describing the characteristics of a file, including file size, file owner, the group to which the file belongs, read and write execution permissions, creating, opening and modifying timestamps, distribution information of data content, and so on. The metadata service directly affects the expansibility, performance, reliability, and stability etc. of the distributed file system.

SUMMARY

The embodiments of the present disclosure propose a distributed metadata management method for a distributed file system.

In the first aspect, the embodiments of the present disclosure provide a distributed metadata management method for a distributed file system, wherein the distributed file system includes at least one server, the at least one server forms a server cluster, the server cluster is used to store file data and metadata, and the method includes: receiving a request to access a target metadata, wherein the request is sent by a first client, the request carries an ID of the target metadata, the ID includes an area ID of the target metadata and an index ID of the target metadata; receiving the area ID returned by the first client; parsing the area ID and routing to a first target partition; finding the target metadata in the first target partition based on the index ID; and returning the target metadata to the first client.

In some embodiments, before obtaining the request to access the target metadata, the method further comprises: sending the area ID stored in a root partition to a first number of connected clients, wherein the root partition refers to a first partition of the server cluster for storing the metadata, each of the first number of clients stores the area ID in a local cache area.

In some embodiments, before receiving the request to access the target metadata, the method further comprises: determining the number of partitions of the server cluster for storing metadata, according to the amount of metadata of the distributed file system; for each partition of the server cluster for storing metadata, storing this partition as a multi-level tree structure, allocating separate storage resources for this partition, and saving the area ID of this partition in the root partition.

In some embodiments, the multi-level tree structure is composed of nodes and subtrees, the nodes are elements stored using the multi-level tree structure, the nodes correspond to the partitions, there is no intersection between the subtrees, and a root node is the first node of the multi-level tree structure, the partition to which the root node corresponds is a root partition.

In some embodiments, the partition is composed of nodes, wherein the nodes include physical servers, virtual machines, containers, and each node in the partition stores the same metadata, while the nodes in different partitions store different metadata.

In some embodiments, parsing the area ID and routing to the first target partition includes: routing to the first target partition corresponding to the area ID, in each partition of the server cluster for storing metadata.

In some embodiments, finding the target metadata in the first target partition based on the index ID, includes: determining whether the index ID includes a second area ID; in response to if yes, parsing the second area ID, routing to a second target partition, and finding the target metadata in the second target partition; in response to if no, finding the target metadata in the first target partition.

In the second aspect, the embodiments of the present disclosure provide a terminal device, the terminal device includes: one or more processors; a storage device for storing one or more programs; when the one or more programs are executed by the one or more processors, the one or more processors implement the method described by any embodiment in the first aspect.

In the third aspect, the embodiments of the present disclosure provide a computer-readable medium on which a computer program is stored, wherein the program when executed by a processor implements the method described by any embodiment in the first aspect.

The embodiments of the present disclosure provide a distributed metadata management method for a distributed file system, wherein the distributed file system includes at least one server, the at least one server forms a server cluster, the server cluster is used to store file data and metadata. A specific mode of implementing the method includes: receiving a request to access a target metadata, wherein the request is sent by a first client, the request carries IDs of the target metadata, the IDs include an area ID of the target metadata and an index ID of the target metadata; receiving the area ID returned by the first client; parsing the area ID and routing to a first target partition; finding the target metadata in the first target partition based on the index ID; and returning the target metadata to the first client.

One of the above embodiments of the present disclosure has the following beneficial effects: the server cluster for storing metadata includes multiple partitions, and metadata is stored in the partitions, wherein the root partition stores area IDs of all the metadata. The area IDs stored in the root partition are sent to a first number of connected clients, and each client can find the partition storing the metadata according to the area ID of the metadata, and after routing to this partition, find the metadata based on the index ID of the metadata. The embodiments of the present disclosure store metadata in the partitions of a server cluster, and by adding new partitions, the upper limit of the number of files that can be stored in the distributed file system can be linearly expanded, thereby improving the storage capacity. The area ID stored in the root partition is actively pushed to the connected clients, the clients search for metadata in each partition according to the area ID and index ID of the metadata, which improves the efficiency of metadata search.

DESCRIPTION OF FIGURES

By reading the detailed description of the non-limiting embodiments with reference to the following figures, other features, purposes and advantages of the present disclosure will become more obvious.

DETAILED DESCRIPTION

Figure 1:
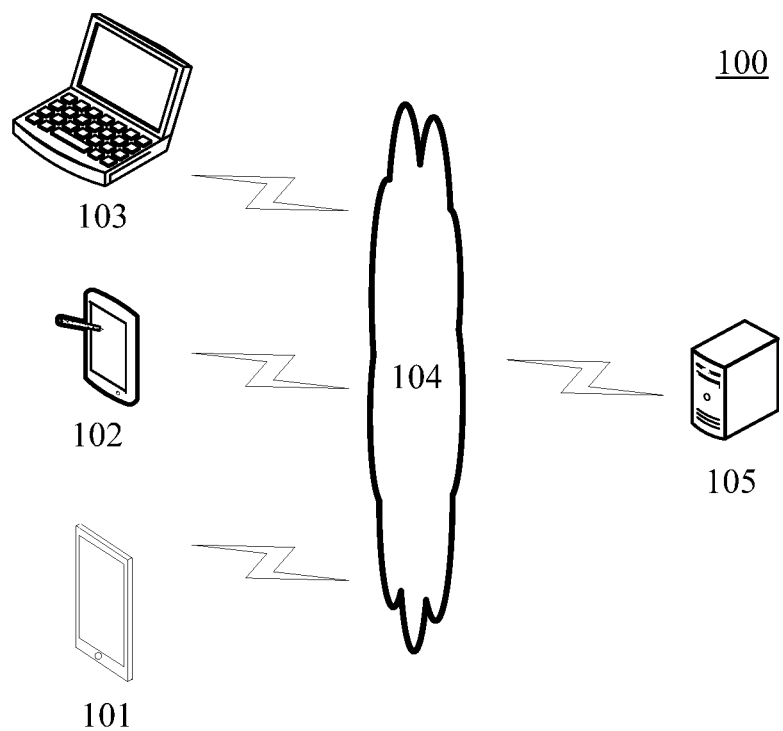
FIG. 1 is an architecture diagram of an exemplary system to which some embodiments of the present disclosure can be applied.

Hereinafter, embodiments of the present disclosure will be described in more detail with reference to the drawings. Although certain embodiments of the present disclosure are shown in the drawings, it should be understood that the present disclosure can be implemented in various forms and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the protection scope of the present disclosure.

In addition, it should be further explained that, for ease of description, the drawings only show the parts related to the relevant invention. In the case of no conflict, the embodiments in the present disclosure and the features in the embodiments can be combined with each other.

It should be noted that such modifiers as "a" and "a plurality of" mentioned in the present disclosure are illustrative instead of restrictive, and those skilled in the art should understand that unless clearly indicated otherwise in the context, they should be understood as "one or more".

Hereinafter, the present disclosure will be described in detail with reference to the drawings and in conjunction with the embodiments.

FIG. 1 shows an exemplary system architecture 100 to which an embodiment of the distributed metadata management method for a distributed file system of the present disclosure can be applied.

As shown in FIG. 1, the system architecture 100 may include terminal devices 101, 102, 103, network 104, and server 105. The network 104 is used to provide a medium for communication links between the terminal devices 101, 102, 103 and the server 105. The network 104 may include various connection types, such as wired, wireless communication links, or fiber optic cables, and so on.

The user can use the terminal devices 101, 102, 103 to interact with the server 105 through the network 104 to receive or send messages, and etc. Various communication client applications, such as data storage applications, data analysis applications, and metadata management applications, and the like, can be installed on the terminal devices 101, 102, 103.

The terminal devices 101, 102, 103 may be hardware or software. When the terminal devices 101, 102, 103 are hardware, they may be various terminal devices with display screens, including but not limited to smart phones, tablet computers, laptop computers, desktop computers, and so on. When the terminal devices 101, 102, 103 are software, they can be installed in the terminal devices listed above. They can be implemented as multiple software or software modules (for example, to provide a request to access the target metadata, etc.), or as a single software or software module. No specific limitation is made here.

The server 105 may be a server that provides various services, such as a server etc. that manages the target metadata inputted by the terminal devices 101, 102, 103. The server may process the received request for accessing the target metadata, and feed the processing result (for example, metadata) back to the terminal devices.

It should be explained that, the distributed metadata service method for a distributed file system provided by the embodiments of the present disclosure may be executed by the server 105, or by a terminal device.

It should be pointed out that, locally the server 105 can also directly obtain the request to access the target metadata, and the server 105 can directly obtain the local access request to find the metadata. In this case, the exemplary system architecture 100 may not include the terminal devices 101, 102, 103 and the network 104.

It should also be further pointed out that, the terminal devices 101, 102, 103 may also be installed with metadata service class applications. In this case, the metadata service method may also be executed by the terminal devices 101, 102, 103. At this time, the exemplary system architecture 100 may not include the server 105 and the network 104 either.

It should be explained that, the server 105 may be hardware or software. When the server 105 is hardware, it can be implemented as a distributed server cluster composed of multiple servers, or as a single server. When the server is software, it can be implemented as multiple software or software modules (for example, to provide metadata service), or be implemented as single software or software module. No specific limitation is made here.

It should be understood that, the numbers of terminal devices, networks, and servers in FIG. 1 are merely illustrative. According to the needs of implementation, there can be any number of terminal devices, networks, and servers.

Figure 2:
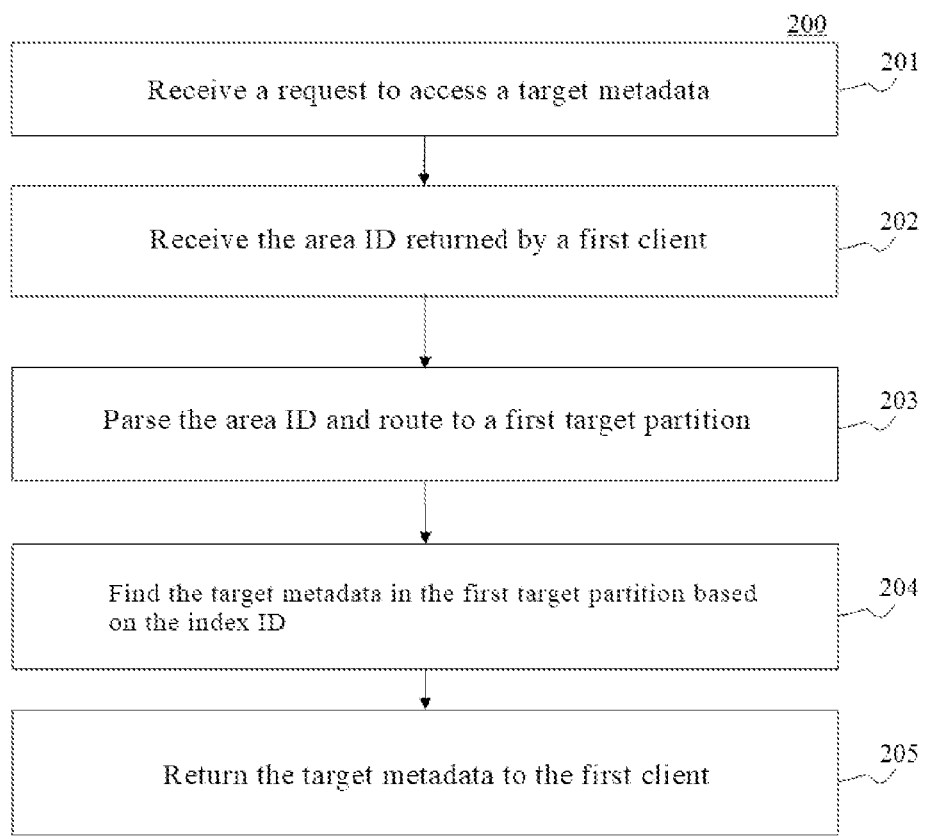
FIG. 2 is a flowchart of some embodiments of the distributed metadata management method for a distributed file system according to the present disclosure.

Continuing to see FIG. 2, there is shown a flow process 200 of some embodiments of the distributed metadata management method for a distributed file system according to the present disclosure. This distributed metadata management method for a distributed file system includes the following steps:

Step 201: Receive a request to access the target metadata.

In some embodiments, the execution body of the distributed metadata management method for a distributed file system (for example, the terminal device shown in FIG. 1) may directly receive a request to access the target metadata. The request is sent by a first client.

The distributed file system includes at least one server. At least one server forms a server cluster. The server cluster is used to store file data and metadata. Optionally, the number of partitions in the server cluster for storing metadata can be determined according to the amount of metadata in the distributed file system. When the initial amount of metadata is fairly small, the server cluster for storing metadata may include only one partition. The first partition in the partitions of the server cluster for storing metadata is called a root partition.

The request sent by the first client carries IDs of the target metadata. The IDs include an area ID of the target metadata and an index ID of the target metadata. Wherein, the area ID refers to a mark that determines a target partition in the various partitions where the target metadata is stored. The metadata of each file in the distributed file system will occupy a fixed storage space, which is called an index. The index ID is a mark that determines the target metadata.

Optionally, the root partition stores the area IDs of the various partitions of the server cluster for storing metadata. As the amount of metadata increases, the number of files stored in the entire distributed file system can be increased by adding new partitions. The metadata of the entire distributed file system is scattered and stored in different partitions. Each partition has a unique area ID. Correspondingly, the ID for each metadata consists of an area ID and an index ID. Optionally, each partition has a unique area ID, and each metadata includes a unique index ID. Upon accessing the metadata, the metadata ID, that is, the area ID and index ID of the metadata, is used as the basis for access.

Optionally, the server cluster used to store metadata includes at least one partition. The partition of the server cluster for storing metadata includes at least one node. The node may include, but is not limited to, physical server, virtual machine, and container. Each node in the partition stores the same metadata, and the metadata stored in nodes at different partitions are different. Each partition of the server cluster for storing metadata saves the metadata of the partition, and there is no need to share storage resources of the server cluster for storing metadata between different partitions.

Optionally, all partitions in the server cluster for storing metadata have the same authority, and there is not a central control node with super administration authority. Therefore, no load bottleneck of the central control node will appear.

For each partition of the server cluster for storing metadata, the partition is stored as a multi-level tree structure, and separate storage resources are allocated to the partition. The area ID of each partition is saved in a root partition of this partition, wherein the root partition refers to the first partition in the partitions of the server cluster for storing metadata.

Optionally, a multi-level tree structure is composed of nodes and subtrees; the nodes are elements stored using the multi-level tree structure; the nodes correspond to metadata; there is no intersection between the subtrees. A root node is the first node of the multi-level tree structure, and the partition storing the root node is a root partition. As the number of files stored in a distributed file system increases, any number of subtrees in each partition stored by the multi-level tree structure can be allocated to a specified new partition, while the metadata can freely migrate in each and every one of the partitions.

Optionally, the metadata in the partition may be any subtree of the multi-level tree structure. Upon storing metadata, the root node starts to store level by level and a multi-level tree structure is built. The root directory is stored in the root partition. Corresponding to the multi-level tree structure, a multi-level tree directory is generated for storage, and sub-directories are constructed level by level starting from the root directory, wherein the root directory is stored in the root partition. If a subtree is to be migrated to another partition, one metadata ID will be saved in the original partition. This metadata ID consists of an area ID of the new partition to which it is migrated and an index ID of the metadata newly generated by the new partition for the migrated subtree node.

Figure 3:
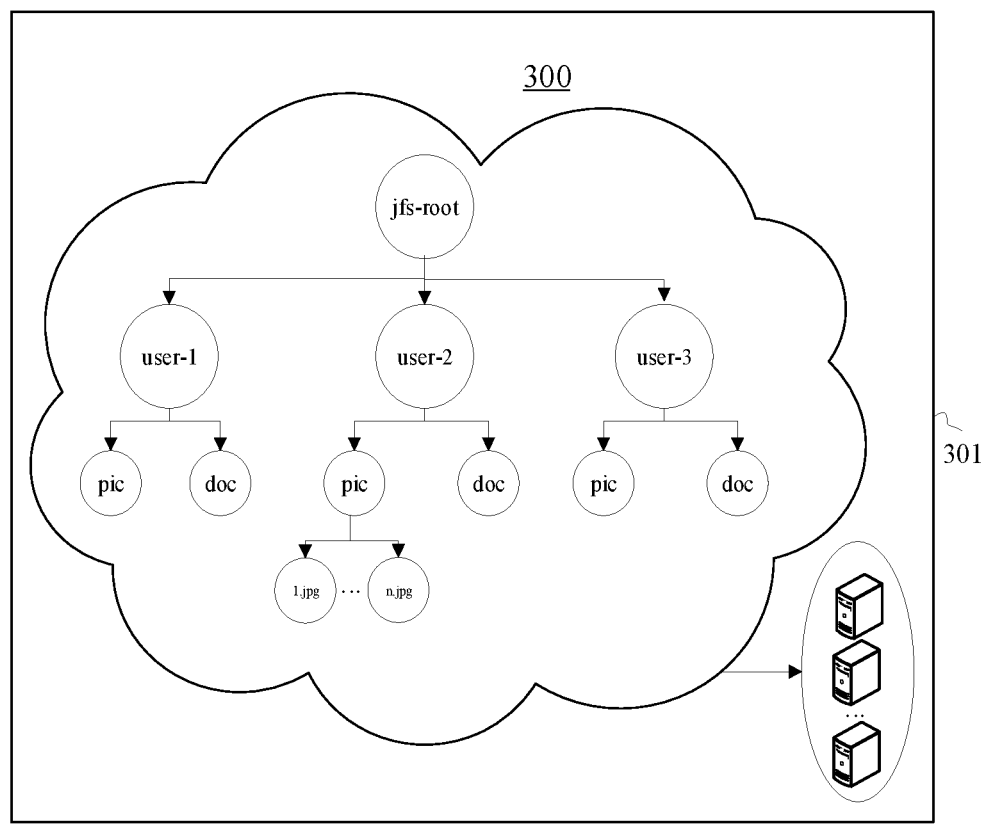
FIG. 3 is a schematic diagram of the multi-level tree structure of a server cluster for storing metadata according to the present disclosure.

Continuing to see FIG. 3, a schematic diagram of the multi-level tree structure of the server cluster for storing metadata according to the present disclosure is shown.

In the application scenario of FIG. 3, there is a multi-level tree-type directory tree in one of the partitions in the server cluster 301 for storing metadata. All nodes are saved as a tree structure, wherein the "user-1 (user-1)" can be the parent node of the "pic (picture)", the "user-1 (user-1)", "user-2 (user-2)" and "user-3 (user-3)" can be sibling nodes at the same level. Optionally, a multi-level tree-type directory tree in one of the partitions in the server cluster 301 for storing metadata, wherein the root node of the tree may be "jfs-root (root node)", the "1.jpg (picture 1)" may be a fourth-level node, and the "user-2 (user-1)" can be a second-level node.

Optionally, before receiving the request to access the target metadata, the above-mentioned execution body sends the area ID stored in the root partition to a first number of connected clients, wherein each of the first number of clients stores the area ID in the local cache area.

Optionally, when a new client connects to the execution body, the execution body will send the area ID stored in the root partition to the client. The local cache area of each client in the first number of clients connected to the execution body saves the area ID stored at the current moment in the root partition of the execution body.

Step 202: Receive the area ID returned by the first client.

In some embodiments, the above execution body receives the area ID returned by the first client. The execution body can send the area ID stored in the root partition to the first number of connected clients, wherein the root partition refers to the first partition of the server cluster for storing metadata. The first number of clients all save an area ID of the metadata. Optionally, the first client searches for the area ID stored in the local cache, and sends the area ID to the execution body.

Step 203: Parse the area ID and route to the first target partition.

In some embodiments, the above-mentioned execution body is routed to the first target partition corresponding to the area ID, in each partition of the server cluster for storing metadata. The routing process is a process of directly routing to the first target partition corresponding to the area ID, in each partition of the server cluster for storing metadata, according to the area ID.

Step 204: Find the target metadata in the first target partition based on the index ID.

In some embodiments, the above-mentioned execution body finds the target metadata in the first target partition based on the index ID. Determine whether the index ID includes a second area ID. In response to determining that the index ID includes a second area ID, parse the second area ID, route to the second target partition, and find the target metadata in the second target partition. In response to determining that the index ID does not include a second area ID, find the target metadata in the first target partition.

Step 205: Return the target metadata to the first client.

In some embodiments, the above-mentioned execution body returns the target metadata found and accessed in the first target partition to the first client.

FIG. 2 gives an embodiment that has the following beneficial effects: metadata is stored in a partition of the server cluster for storing metadata, wherein the area IDs of all the metadata are stored in the root partition, and after routing to the partition according to the area ID, the metadata is found based on the index ID of the metadata. The embodiment of the present disclosure stores metadata in partitions in a server cluster. By adding new partitions, the upper limit of the number of files that can be stored by the distributed file system may be linearly expanded, and the storage capacity is improved. At the same time, searching for metadata according to the area ID and index ID of the metadata, in the partitions of the server cluster for storing metadata improves the efficiency of metadata search.

Figure 4:
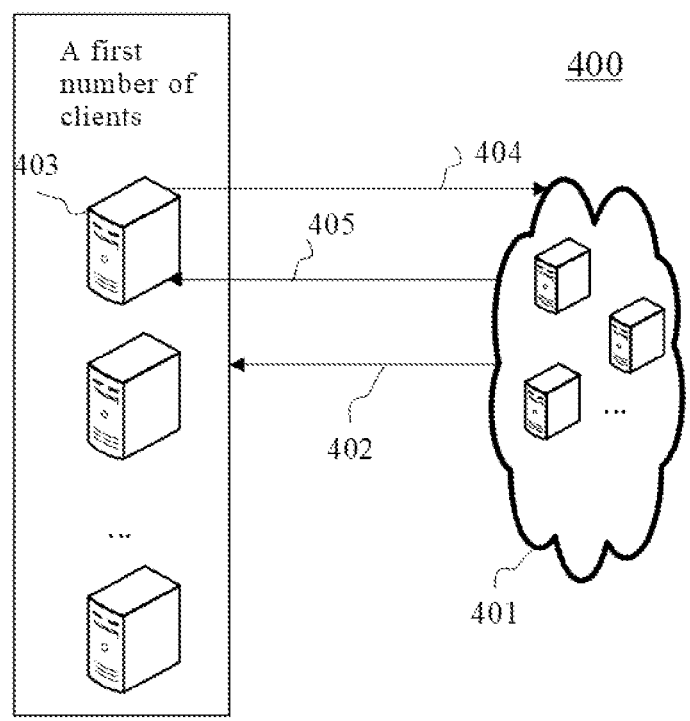
FIG. 4 is a schematic diagram of an application scenario of the distributed metadata management method for a distributed file system according to some embodiments of the present disclosure.

Continuing to see FIG. 4, a schematic diagram of an application scenario of the distributed metadata management method for a distributed file system according to the present disclosure is shown.

In the application scenario of FIG. 4, the server cluster 401 for storing metadata executes step 402, and step 402 sends the area ID stored in its root partition to a first number of connected clients, wherein the first number of clients each stores the area ID in a local cache area. The first client 403 sends a request 404 to access the target metadata, wherein the request carries an ID of the target metadata, the ID includes a area ID of the target metadata and an index ID of the target metadata. After the server cluster 401 for storing metadata finds the target metadata, step 405 is executed to return the target metadata to the first client.

In the distributed metadata management method for a distributed file system provided by the embodiments of the present application, the area ID stored in the root partition is first actively sent to a first number of connected clients, so as to make it convenient for the connected first number of clients to search for the area ID in the local cache area to improve the efficiency of metadata search.

Figure 5:
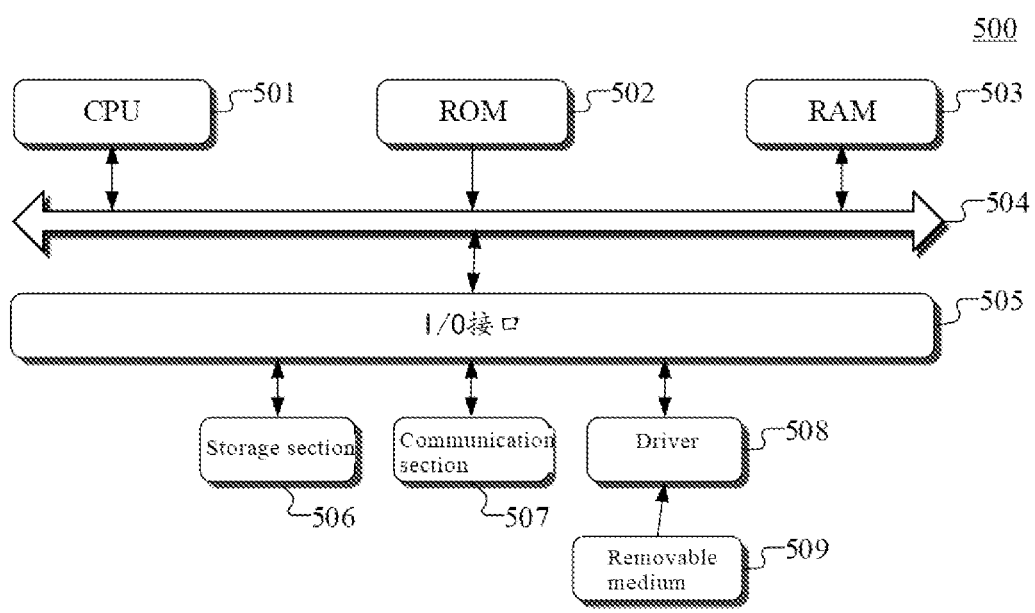
FIG. 5 is a schematic structural diagram of the computer system of a server suitable for implementing some embodiments of the present disclosure.

Next, see FIG. 5, where it is shown a schematic structural diagram of the computer system 500 suitable for implementing the server of an embodiment of the present disclosure. The server shown in FIG. 5 is only an example, and should not bring any limitation to the function and scope of use of the embodiment of the present disclosure.

As shown in FIG. 5, the computer system 500 includes a Central Processing Unit (CPU) 501, which can execute various appropriate actions and processing according to the program stored in the Read-Only Memory (ROM) 502 or the program loaded from the storage section 508 to the Random Access Memory (RAM) 503. In the RAM 503, various programs and data required for the operation of the system 500 are also stored. The CPU 501, the ROM 502, and the RAM 503 are connected to each other through a bus 504. An input/output (I/O) interface 505 is also connected to the bus 504.

The following components are connected to the I/O interface 505: a storage section 506 including a hard disk and the like; and a communication section 507 including network interface cards like LAN (Local Area Network) card, modem, and so on. The communication section 507 performs communication processing via a network such as the Internet. A driver 508 is also connected to the I/O interface 505 as needed. A removable medium 509, such as a magnetic disk, an optical disk, a magneto-optical disk, a semiconductor memory, etc., is installed on the driver 508 as needed, so that the computer program read therefrom is installed into the storage section 506 as needed.

In particular, according to an embodiment of the present disclosure, the process described above with reference to the flowchart can be implemented as a computer software program. For example, the embodiment of the present disclosure includes a computer program product, which includes a computer program carried on a computer-readable medium, and the computer program contains program code for executing the method shown in the flowchart. In such an embodiment, the computer program can be downloaded and installed from the network through the communication section 507, and/or installed from the removable medium 509. When the computer program is executed by the central processing unit (CPU) 501, the above-mentioned functions defined in the method of the present disclosure are executed. It should be noted that the computer-readable medium described in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or component, or a combination of any of the above. More specific examples of the computer-readable storage media may include, but are not limited to: electrical connections with one or more wires, portable computer disks, hard disks, Random Access Memory (RAM), Read-Only Memory (ROM), Erasable Programmable Read-Only Memory (EPROM or flash memory), optical fiber, portable Compact Disk Read-Only Memory (CD-ROM), optical storage device, magnetic storage device, or any suitable combination of the above. In the present disclosure, the computer-readable storage medium may be any tangible medium that contains or stores a program, and the program may be used by or in combination with an instruction execution system, device, or component. In the present disclosure, the computer-readable signal medium may include a data signal propagated in a baseband or as a part of a carrier wave, wherein a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable medium may send, propagate, or transmit the program for use by or in combination with an instruction execution system, device, or component. The program code contained on the computer-readable medium can be transmitted by any suitable medium, including but not limited to: wireless, wired, optical cable, RF, etc., or any suitable combination of the above.

The computer program code used to perform the operations of the present disclosure can be written in one or more programming languages or a combination thereof. The programming languages include object-oriented programming languages—such as Java, Golang, C++, and also include conventional procedural programming languages—such as C language or similar programming languages. The program code can be executed entirely on the user's computer, partly on the user's computer, executed as an independent software package, partly on the user's computer and partly on a remote computer, or entirely on a remote computer or server. Where a remote computer is involved, the remote computer can be connected to the user's computer through any kind of networks, including a Local Area Network (LAN) or a Wide Area Network (WAN), or connected to an external computer (for example, connect via Internet by an Internet service provider).

The flowchart and block diagram in the accompanying drawings illustrate the architecture, functions and operations that may be possibly implemented by the system, method and computer program product according to various embodiments of the present disclosure. In this regard, each block in the flowchart or block diagram may represent a module, program segment, or part of code, and the module, program segment, or part of code contain one or more executable instructions for performing the specified logic function. It should also be noted that, in some alternative implementations, the functions marked in the block may also occur in an order different from that marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or by a combination of the dedicated hardware and computer instructions.

The above description is only an explanation of the preferred embodiments of the present disclosure and the applied technical principles. Those skilled in the art should understand that the scope of the invention involved in this disclosure is not limited to the technical solutions formed by the particular combination of the above technical features, but should also cover other technical solutions formed by arbitrarily combining the above technical features or their equivalents without departing from the above inventive concept. For example, technical solutions are formed by replacing the above features with the technical features having similar functions disclosed in (but not limited to) the present disclosure.

The invention claimed is:

1. A distributed metadata management method for a distributed file system, wherein the distributed file system includes at least one server, the at least one server forms a server cluster, the server cluster is used to store file data and metadata, and the method comprises:
   receiving, by the server cluster, a request to access a target metadata, wherein the request is sent by a first client, the request carries an ID of the target metadata, the ID includes an area ID of the target metadata and an index ID of the target metadata;
   receiving, by the server cluster, the area ID from the first client;
   parsing, by the server cluster, the area ID and routing to a first target partition corresponding to the area ID;
   finding, by the server cluster, the target metadata in the first target partition based on the index ID; and
   returning, by the server cluster, the target metadata to the first client,
   wherein a root partition stores all area IDs of various partitions of the server cluster for storing metadata, and before the receiving the request to access the target metadata, the method further comprises: actively sending, by the server cluster, all the area IDs stored in the root partition to a first number of connected clients, wherein the root partition refers to a first partition of the server cluster for storing the metadata, the first client belongs to the first number of the connected clients, and each of the first number of connected clients stores all the area IDs in a local cache area such that the area IDs stored in the local cache area of each of the first number of connected clients are kept consistent with the area IDs stored in the root partition,
   wherein before the receiving the area ID from the first client, the method further comprises: searching the area IDs stored in the local cache area of the first client for the area ID of the target metadata, and
   wherein the area ID of the target metadata refers to a mark that determines the first target partition in the various partitions where the target metadata is stored and the index ID of the target metadata is a mark that determines the target metadata.

2. The method according to claim 1, wherein, before obtaining the request to access the target metadata, the method further comprises:
   determining a number of partitions of the server cluster for storing metadata according to an amount of metadata of the distributed file system;
   for each partition of the server cluster for storing metadata, storing this partition as a multi-level tree structure, allocating separate storage resources for this partition, and saving the area ID of this partition in the root partition.

3. The method according to claim 2, wherein, the multi-level tree structure is composed of nodes and subtrees, the nodes are elements stored using the multi-level tree structure, the nodes correspond to the partitions, there is no intersection between the subtrees, and
   a root node is a first node of the multi-level tree structure, the partition to which the root node corresponds is the root partition.

4. The method according to claim 2, wherein, the partition is composed of nodes, wherein the nodes include physical servers, virtual machines, containers, and each node in the partition stores the same metadata, while the nodes in different partitions store different metadata.

5. The method according to claim 4, wherein parsing the area ID and routing to the first target partition corresponding to the area ID, includes:
   routing to the first target partition corresponding to the area ID in each partition of the server cluster for storing metadata.

6. The method according to claim 5, wherein, said finding the target metadata in the first target partition based on the index ID, includes:
   determining whether the index ID includes a second area ID;
   in response to if yes, parsing the second area ID, and routing to a second target partition corresponding to the second area ID, finding the target metadata in the second target partition; and
   in response to if no, finding the target metadata in the first target partition.

7. A first terminal device, including:
   one or more processors;
   a storage device on which one or more programs are stored;
   when the one or more programs are executed by the one or more processors, the one or more processors implement operations of:
   receiving, by the server cluster, a request to access a target metadata, wherein the request is sent by a first client, the request carries an ID of the target metadata, the ID includes an area ID of the target metadata and an index ID of the target metadata;

receiving, by the server cluster, the area ID from the first client;

parsing, by the server cluster, the area ID and routing to a first target partition corresponding to the area ID;

finding, by the server cluster, the target metadata in the first target partition based on the index ID; and returning, by the server cluster, the target metadata to the first client, wherein a root partition stores all area IDs of various partitions of the server cluster for storing metadata, and before the receiving the request to access the target metadata, the method further comprises: actively sending, by the server cluster, all the area IDs stored in the root partition to a first number of connected clients, wherein the root partition refers to a first partition of the server cluster for storing the metadata, the first client belongs to the first number of the connected clients, and each of the first number of connected clients stores all the area IDs in a local cache area such that the area IDs stored in the local cache area of each of the first number of connected clients are kept consistent with the area IDs stored in the root partition, wherein before the receiving the area ID from the first client, the method further comprises: searching the area IDs stored in the local cache area of the first client for the area ID of the target metadata, and wherein the area ID of the target metadata refers to a mark that determines the first target partition in the various partitions where the target metadata is stored and the index ID of the target metadata is a mark that determines the target metadata.

8. A non-transitory computer-readable storage medium on which a computer program is stored, wherein, the program when executed by the processor implements operations of:

receiving, by the server cluster, a request to access a target metadata, wherein the request is sent by a first client, the request carries an ID of the target metadata, the ID includes an area ID of the target metadata and an index ID of the target metadata;

receiving, by the server cluster, the area ID from the first client;

parsing, by the server cluster, the area ID and routing to a first target partition corresponding to the area ID;

finding, by the server cluster, the target metadata in the first target partition based on the index ID; and returning, by the server cluster, the target metadata to the first client, wherein a root partition stores all area IDs of various partitions of the server cluster for storing metadata, and before the receiving the request to access the target metadata, the method further comprises: actively sending, by the server cluster, all the area IDs stored in the root partition to a first number of connected clients, wherein the root partition refers to a first partition of the server cluster for storing the metadata, the first client belongs to the first number of the connected clients, and each of the first number of connected clients stores all the area IDs in a local cache area such that the area IDs stored in the local cache area of each of the first number of connected clients are kept consistent with the area IDs stored in the root partition, wherein before the receiving the area ID from the first client, the method further comprises: searching the area IDs stored in the local cache area of the first client for the area ID of the target metadata, and wherein the area ID of the target metadata refers to a mark that determines the first target partition in the various partitions where the target metadata is stored and the index ID of the target metadata is a mark that determines the target metadata.

* * * * *